(12) United States Patent
Choi et al.

(10) Patent No.: US 9,742,340 B2
(45) Date of Patent: Aug. 22, 2017

(54) APPARATUS FOR CONTROLLING INVERTER

(71) Applicant: LSIS CO., LTD, Gyeonggi-do (KR)

(72) Inventors: Seung-Cheol Choi, Gyeonggi-do (KR); An-No Yoo, Seoul (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/927,996

(22) Filed: Oct. 30, 2015

(65) Prior Publication Data

US 2016/0126881 A1    May 5, 2016

(30) Foreign Application Priority Data

Oct. 30, 2014    (KR) .................. 10-2014-0148954

(51) Int. Cl.
*H02P 21/00*    (2016.01)
*H02P 27/06*    (2006.01)
*H02P 1/02*    (2006.01)
*H02P 1/52*    (2006.01)
*H02P 21/06*    (2016.01)

(52) U.S. Cl.
CPC .............. *H02P 27/06* (2013.01); *H02P 1/029* (2013.01); *H02P 21/0035* (2013.01); *H02P 1/52* (2013.01); *H02P 21/06* (2013.01)

(58) Field of Classification Search
CPC .... H02P 21/0035; H02P 21/06; H02P 21/146; H02P 2207/05; Y02T 10/643
USPC .................................................. 318/400.02
See application file for complete search history.

(56) References Cited

U.S. PATENT DOCUMENTS

| 4,451,112 A * | 5/1984 | Hattori ...................... H02P 1/30 318/778 |
| 5,347,443 A * | 9/1994 | Muramatsu ........... H02M 5/458 318/778 |
| 7,710,053 B2 | 5/2010 | Tan et al. |
| 2008/0265832 A1* | 10/2008 | Tan ......................... H02P 1/029 318/802 |

(Continued)

FOREIGN PATENT DOCUMENTS

| JP | S58130795 A | 8/1983 |
| JP | S62126892 A | 6/1987 |
| JP | H0583965 | 4/1993 |

(Continued)

OTHER PUBLICATIONS

Extended European Search Report in Application No. EP 15190148.5 dated Mar. 31, 2016 in 7 pages.

(Continued)

*Primary Examiner* — Kawing Chan
*Assistant Examiner* — Bradley Brown
(74) *Attorney, Agent, or Firm* — Nath, Goldberg & Meyer; Jerald L. Meyer

(57) ABSTRACT

Disclosed herein is an apparatus for controlling an inverter in an inverter system. The apparatus includes: a first determining unit to determine a magnitude, a phase and a frequency of an input voltage to an electric motor in the inverter system; and a second determining unit to determine a restart command voltage for generating an inverter driving voltage larger than a residual voltage in the electric motor using the magnitude of the input voltage determined by the first determining unit, when the inverter system is restarted.

4 Claims, 6 Drawing Sheets

(56) References Cited

U.S. PATENT DOCUMENTS

2013/0076285 A1\* 3/2013 Choi ................... H02P 29/022
                                                                    318/453

FOREIGN PATENT DOCUMENTS

| | | |
|---|---|---|
| JP | H06319291 A | 11/1994 |
| JP | 2000341989 A | 12/2000 |
| JP | 2001136787 A | 5/2001 |
| JP | 2002281795 A | 9/2002 |
| JP | 2005261052 A | 9/2005 |
| JP | 2008271751 A | 11/2008 |
| KR | 20020036535 A | 5/2002 |

OTHER PUBLICATIONS

Japanese Office Action for App. No. 2015-214760, dated Aug. 30, 2016 in 3 pages.

\* cited by examiner

PRIOR ART

PRIOR ART

APPARATUS FOR CONTROLLING INVERTER

CROSS REFERENCE TO RELATED APPLICATION

This application claims the benefit of Korean Patent Application No. 10-2014-0148954, filed on Oct. 30, 2014, entitled "APPARATUS FOR CONTROLLING INVERTER", which is hereby incorporated by reference in its entirety into this application

BACKGROUND

1. Technical Field

The present disclosure relates to an apparatus for controlling an inverter.

2. Description of the Related Art

A medium voltage inverter refers to an inverter using an input power greater than 600 $V_{RMS}$ of line voltage, and its rated power capacity ranges from several hundreds of kW to several tens of MW. Medium voltage inverters are commonly used in fans, pumps, compressors, etc. Among such medium voltage inverters, a cascaded multi-level inverter is frequently used, of which output phase-voltages have three or more output voltage levels. The magnitude and the number of output voltage levels of a multi-level inverter are determined depending on the number of power cells thereof. Each of the power cells uses an isolated input voltage.

Typically, a medium voltage electric motor driven by a medium voltage inverter has very high inertia. Accordingly, when an error takes place in an input power or service interruption occurs, it takes long time for the electric motor to completely stop operating for restarting. In order to reduce the time period for restarting, a voltage may be applied according to a voltage/frequency ratio (V/f) during the rotation of the electric motor. However, this may result in a large inrush current to cause malfunction in an inverter or an electric motor.

For this reason, in order to reduce time period for restarting and avoid malfunction in an inverter or an electric motor, a voltage measuring device is employed. However, when the voltage measuring device consisting of a passive element such as a resistor is employed for saving cost, there is a problem in that an error in the measured voltage takes place due to an error in resistance. In addition, an inverter has factors causing voltage drop such as pulse width modulation (PWM) of an output voltage and dead time. In particular, for a medium voltage inverter having a low switching frequency, it is difficult to learn an output voltage precisely.

For these reasons, there is a problem in restarting when the measured voltage is used as the output voltage from the inverter.

SUMMARY

An aspect of the present disclosure is to provide an apparatus for controlling an inverter that restarts an electric motor stably by determining an output voltage from an inverter taking into account a measurement error in the output voltage In accordance with one aspect of the present disclosure, an apparatus for controlling an inverter in an inverter system includes: a first determining unit to determine a magnitude, a phase and a frequency of an input voltage to an electric motor in the inverter system; and a second determining unit to determine a restart command voltage for generating an inverter driving voltage larger than a residual voltage in the electric motor using the magnitude of the input voltage determined by the first determining unit, when the inverter system is restarted.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION

As the present disclosure may be variously modified and have several exemplary embodiments, specific exemplary embodiments will be shown in the accompanying drawings and be described in detail in a detailed description. However, it is to be understood that the present disclosure is not limited to the specific exemplary embodiments, but includes all modifications, equivalents, and substitutions included in the spirit and the scope of the present disclosure.

Hereinafter, exemplary embodiments of the present disclosure will be described in detail with reference to the accompanying drawings.

Figure 1:
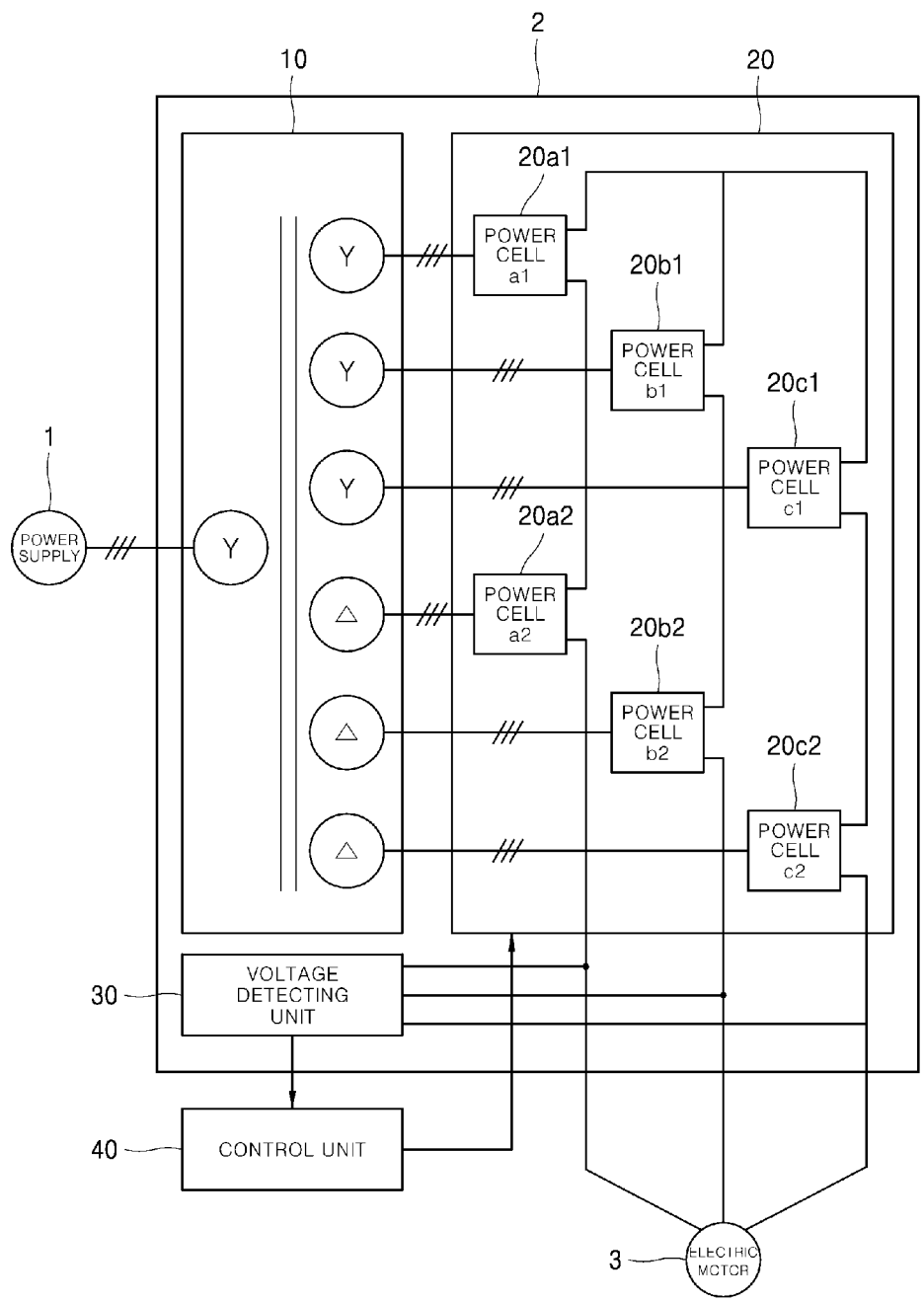
FIG. 1 is a view illustrating an example of a medium voltage inverter system employing an apparatus for controlling an inverter according to an exemplary embodiment of the present disclosure.

FIG. 1 is a view illustrating an example of a medium voltage inverter system employing an apparatus for controlling an inverter according to an exemplary embodiment of the present disclosure.

As shown in FIG. 1, in the system employing the apparatus for controlling an inverter according to an exemplary embodiment of the present disclosure, an inverter 2 is configured to invert a three-phase power having 600 $V_{RMS}$ or greater of line voltage applied from a three-phase power supply 1 and provide it to a medium voltage three-phase electric motor 3. The three-phase electric motor 3 may be, but is not limited to, an induction machine or a synchronous machine.

The inverter 2 may include a phase-shifting transformer 10, a plurality of power cells 20, a voltage detecting unit 30, and a control unit 40.

The phase-shifting transformer 10 may isolate power input from the power supply 1 and may change the phase and magnitude of a voltage as required by the plurality of power cells 20 to provide it to the plurality of power cells 20.

By performing such phase shifting, it is possible to improve the total harmonic distortion (THD) of an input current.

The plurality of power cells 20 may receive an output voltage from the phase-shifting transformer 10, and output voltages from the medium voltage inverter 2 may be synthesized by summing outputs from the power cells in respective phases.

That is, in FIG. 1, an output voltage in phase-a from the inverter 2 is the sum of output voltages from power cells 20a1 and 20a2 connected in series, an output voltage in phase-b from the inverter 2 is the sum of output voltages from power cells 20b1 and 20b2 connected in series, and an output voltage in phase-c from the inverter 2 is the sum of output voltages from power cells 20c1 and 20c2 connected in series. Although two power cells are connected in series in FIG. 1 for convenience of illustration, the number of the power cells is not limited to two. Those skilled in the art will appreciate that the number of power cells connected in series may vary depending on the output voltage from the inverter 2. The plurality of power cells has the same configuration. In the following descriptions, the power cells are referred to as "power cells20" regardless of their phases.

The synthesized output voltages from inverter 2 in the respective phases have the same magnitude but have different phases, each with a phase shift of 120 degrees from the other phases. In addition, it is to be understood that the number of the power cells 20 of the inverter 2 may be increased, and that the THD or the voltage change ratio dv/dt of output voltages applied to the electric motor 3 may be improved by various switching manners.

The voltage detecting unit 30 may detect voltages input to the electric motor 3 in a normal operation state, i.e., output voltages from the inverter 2. The detected output voltages may be used for synchronous bypass, output power calculation and restarting the electric motor 3, etc.

The control unit 40 may be implemented as the apparatus for controlling an inverter according to the exemplary embodiment of the present disclosure. The control unit 40 may receive a voltage from the voltage detecting unit 30 and generate a control signal for controlling the plurality of power cells 20 accordingly. The specific configuration and functionality of the control unit 40 will be described with reference to the drawings below.

Figure 2:
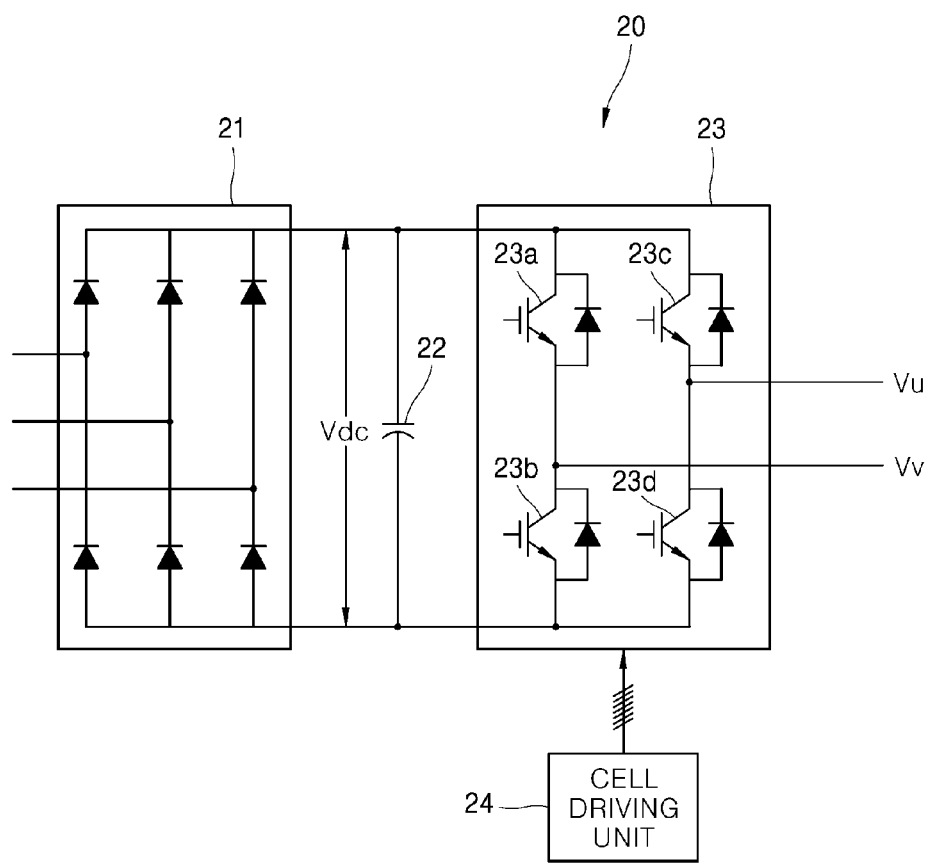
FIG. 2 is a diagram illustrating a specific configuration of one of the power cells shown in FIG. 1.

FIG. 2 is a diagram illustrating a specific configuration of one of the power cells shown in FIG. 1.

As shown in FIG. 2, the power cell 20 employed in the medium voltage inverter system according to an exemplary embodiment of the present disclosure may include a rectifying unit 21, a direct-current (DC) stage capacitor 22, an inverter unit 23 and a cell driving unit 24.

The rectifying unit 21 may include six diodes and may rectify alternating current (AC) voltages input from the phase-shift transformer 10 (in FIG. 10) to DC voltages. The magnitude of the rectified voltage at the DC stage may be determined based on the difference between the input power to the rectifying unit 21 and the output power from the power cell 20. Specifically, the DC stage voltage increases if the input power supplied from the phase-shifting transformer 10 is larger than the output power consumed in a load, and the DC stage voltage decreases otherwise. The DC stage capacitor 22 may absorb the instantaneous power difference between the input stage and the output stage.

The inverter unit 23 configured as a single phase full bridge inverter, for example, may synthesize output voltages from the DC stage voltage via a plurality of power switches 23a to 23d.

The cell driving unit 24 may be disposed in every power cell 20, and may generate gating signals for determining switching on/off of the power switches 23a to 23d of the inverter unit 23, to provide them to the power switches 23a to 23d of the inverter unit 23. The cell driving unit 24 may be operated according to a control signal from the control unit 40 (in FIG. 1).

In the inverter system thus configured, the control unit 40 may generate a command voltage according to voltage-frequency relationship in a normal operation and provide it to the cell driving units 24. When an input power is instantaneously interrupted and then restored, the control unit 40 may apply a voltage of predetermined magnitude and phase to the power cell 20, thereby restarting the electric motor.

Figure 3:
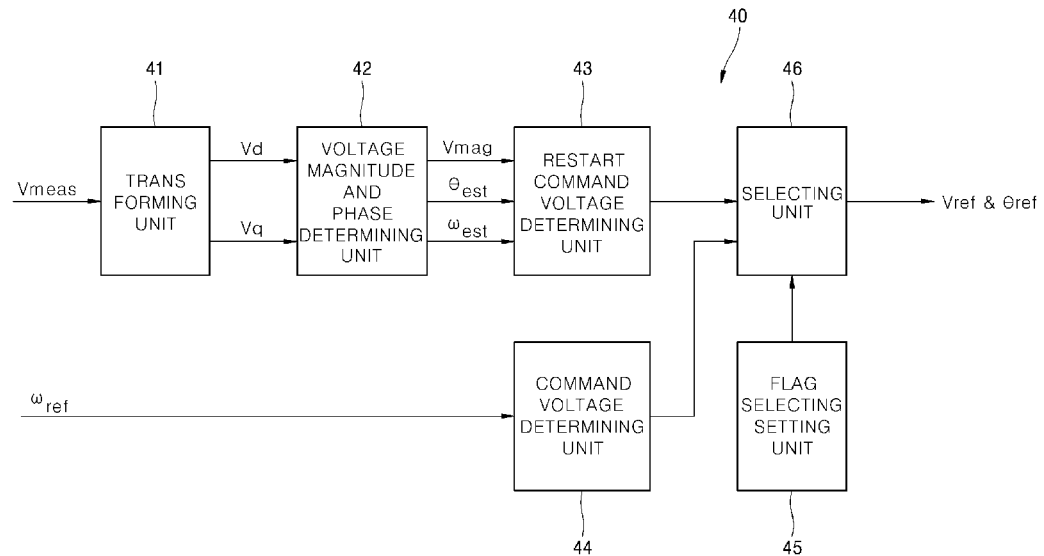
FIG. 3 is a block diagram of an apparatus for controlling an inverter according to an exemplary embodiment of the present disclosure.

FIG. 3 is a block diagram of an apparatus for controlling an inverter according to an exemplary embodiment of the present disclosure, in which a specific configuration of the control unit 40 of FIG. 1 is shown.

As shown in FIG. 3, the control unit 40 may include a transforming unit 41, a voltage magnitude and phase determining unit 42, a restart command voltage determining unit 43, a command voltage determining unit 44, a flag setting unit 45 and a selecting unit 46.

The command voltage determining unit 44 may determine a command voltage according to a command frequency ($\omega_{ref}$). The inverter 2 is driven at a constant ratio between voltage and frequency, and thus a command voltage corresponding to an input command frequency may be determined.

The transforming unit 41 transforms the input voltage to the electric motor 3 (output voltage from the inverter) detected by the voltage detecting unit 30 (in FIG. 1) into d-axis and q-axis voltage components in the synchronous coordinate system. The voltage magnitude and phase determining unit 42 may detect the magnitude, phase and frequency of the input voltage to the electric motor from the d-axis and q-axis voltage components. Phase detection may be performed by a typical phase loop lock (PLL), etc.

The restart command voltage determining unit 43 may determine a restart command voltage using the magnitude and phase of the voltage input to the electric motor determined by the voltage magnitude and phase determining unit 42, etc.

The flag setting unit 45 may set a flag to 1 when an abnormality occurs in an input power, and may set the flag to 0 when normal operation is possible to provide it to the selecting unit 46.

When a normal input power is received and the flag is set to 1, i.e., in the restart section, the selecting unit 46 may select a command voltage from the restart command voltage determining unit 43 to provide it to the plurality of power cells 20. When the flag is set to 0, the selecting unit 46 may provide a command voltage from the command voltage determining unit 44 to the plurality of power cells 20.

Hereinafter, a way of determining the magnitude and phase of a command voltage in the restart command voltage determining unit of an existing inverter system will be described first, and then that of the restart command voltage determining unit 43 employed in the apparatus 40 for controlling an inverter according to the present disclosure will be described for comparison.

Figure 4:
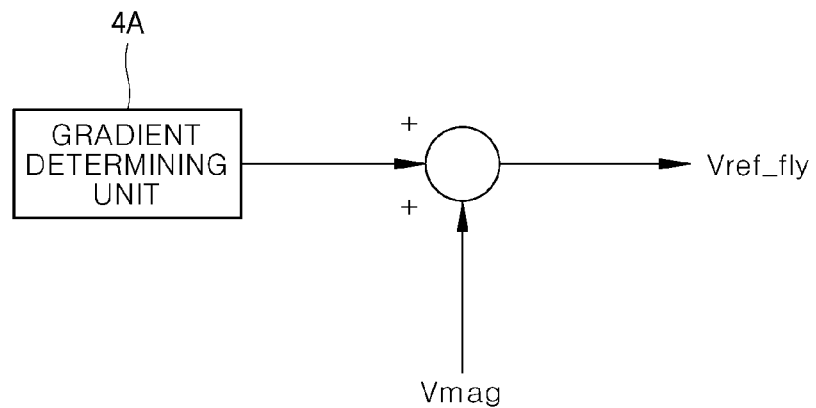
FIGS. 4 and 5 are diagrams for conceptually illustrating a way of determining the magnitude and phase of an instruction voltage in the prior art.
Figure 5:
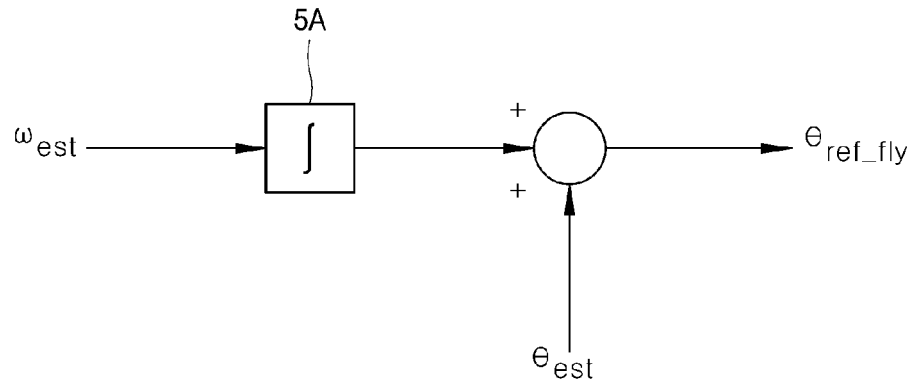

FIGS. 4 and 5 are diagrams for conceptually illustrating a way of determining the magnitude and phase of a command voltage in the prior art.

As shown in FIGS. 4 and 5, the magnitude of the command voltage in the restart section is calculated by adding the magnitude of the input voltage $V_{mag}$ to the electric motor determined by the voltage magnitude and phase determining unit to the magnitude of the voltage change versus time determined by a gradient determining unit 4A. The magnitude of the command voltage may be expressed in the following Equation:

$$V_{ref\_fly} = V_{mag} + a \cdot t \quad \text{[Mathematical Expression 1]}$$

where a denotes voltage change versus time and may be predetermined value.

In addition, the phase $\theta_{ref\_fly}$ of the command voltage in the restart section may be calculated by adding the phase $\theta_{est}$ of the input voltage to the electric motor to the phase of the time integral of frequency $\omega_{est}$ of the input voltage to the electric motor, which is determined by the voltage magnitude and phase determining unit, by an integration unit 5A. The phase of the command voltage may be expressed in the following Equation:

$$\theta_{ref\_fly} = \theta_{est} + \int \omega_{est} dt \quad \text{[Mathematical Expression 2]}$$

However, the magnitude and phase of the command voltage determined by the measured value by the voltage detecting unit consisting of passive elements such as resistors may result in problems such as occurrence of inrush current due to various factors, including an error in the measured voltage stemming from an error in resistance, voltage drop in output from an inverter, and dead time.

Figure 6:
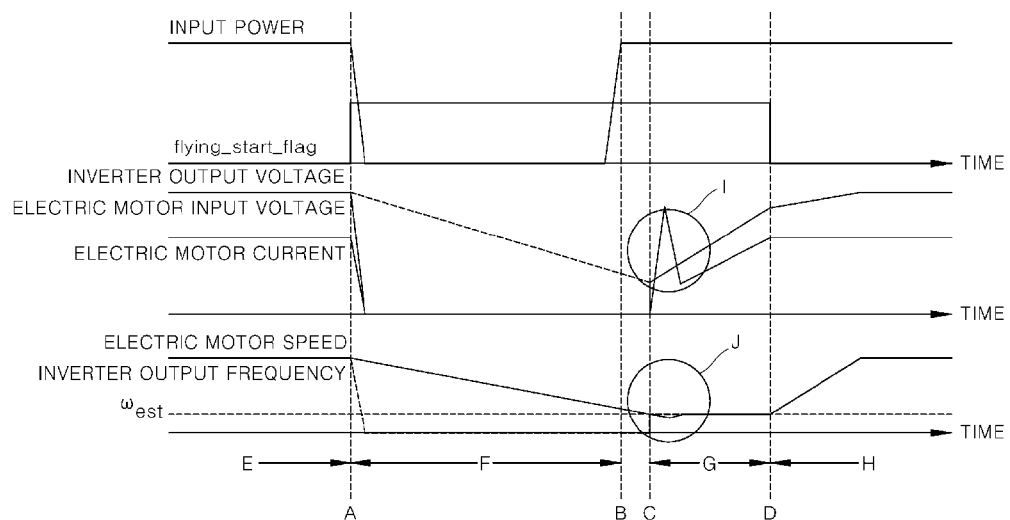
FIG. 6 is a graph for illustrating a sequence of restarting an inverter in the prior art.

FIG. 6 is a graph for illustrating a sequence of restarting an inverter in the prior art. The sequence of restarting an inverter is carried out using the magnitude and phase of the command voltage determined according to the way illustrated in FIGS. 4 and 5.

As can be seen from FIG. 6, an input power supplied from a power supply is interrupted at time point A and is restored at time point B. Even though the input power is restored at time point B, however, the electric motor restarts at time point C after some time interval (B-C) and is operated normally after time point D, as shown in FIG. 6. That is, the electric motor is operated normally in sections E and H, abnormality occurs in input power in section F, and the electric motor restarts in section G.

When the magnitude of the restart command voltage determined as shown in FIG. 4 is used, there is a problem in that an inrush current I occurs in an input current to an electric motor, since the voltage detected by the voltage detecting unit is smaller than the voltage actually input to the electric motor due to dead time and voltage drop, etc. That is, when an output voltage from an inverter is smaller than a residual voltage in an electric motor, a current flowing in the electric motor flows to the inverter, such that there may be problems such as regeneration operation or inrush current, etc.

In view of this, according to the exemplary embodiment of the present disclosure, the apparatus for controlling an inverter takes into account a measurement error by a voltage detecting unit, so that an electric motor can be restarted stably without inrush current.

Figure 7:
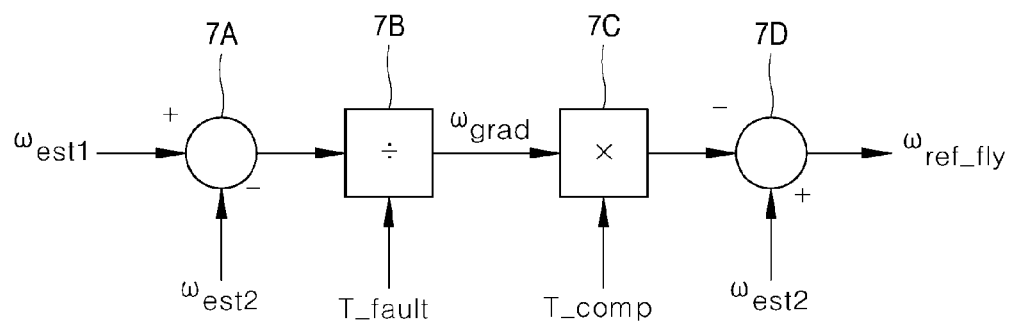
FIGS. 7 and 8 are diagrams for illustrating a way of determining the magnitude of an instruction voltage according to an exemplary embodiment of the present disclosure.
Figure 8:
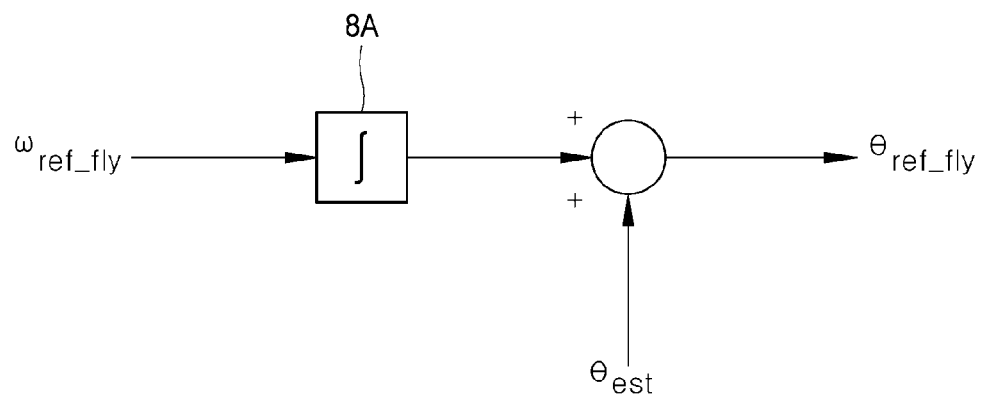

FIGS. 7 and 8 are diagrams for illustrating ways of determining the magnitude of a command voltage in a restart section according to exemplary embodiments of the present disclosure.

FIG. 7 is a diagram for illustrating a way of determining a magnitude of a command voltage according to a first exemplary embodiment of the present disclosure. As can be seen from FIG. 7, the magnitude ($V_{ref}$) of the command voltage in the restart section is calculated by adding the magnitude of the input voltage $V_{mag}$ to the electric motor determined by the voltage magnitude and phase determining unit 42 (in FIG. 3) and an offset voltage $V_{offset}$ to the magnitude of the voltage change versus time determined by a gradient determining unit 7A. In other words, according to the exemplary embodiment of the present disclosure shown in FIG. 7, the offset voltage $V_{offset}$ is added in order to compensate for a measurement error of the input voltage $V_{mag}$ to the electric motor measured from the voltage detecting unit 30 $V_{offset}$ at the initial restarting of an electric motor.

In this regard, the offset may be a predetermined constant value determined based on driving characteristics of an inverter or an electric motor, etc., or may be a variable value varying with time.

Specifically, the offset voltage may be designed to have a specific value taking into account various characteristics of an inverter and/or an electric motor in the step of configuring an inverter system. Alternatively, a voltage change value determined based on characteristics of a voltage change with time may be applied as a real-time offset voltage.

As described above, the offset voltage may be added to the magnitude of the command voltage at the time of restarting until the output from the inverter reaches a stable output voltage level.

That is, the driving voltage of the inverter is determined by the command voltage to which the offset voltage is added, such that the driving voltage of the inverter larger than the residual voltage in the electric motor can be applied at the time of restarting an inverter system. As a result, the apparatus for controlling an inverter according to the exemplary embodiment of the present disclosure can prevent regeneration operation of the inverter and inrush current accompanying it.

The magnitude of voltage change versus time determined by the gradient determining unit 7A may be a preset value determined based on the capacity of an electric motor, etc., or a value input by a user.

That is, the magnitude of the command voltage determined according to the first exemplary embodiment may be expressed in the following Equation:

$$V_{ref\_fly} = V_{mag} + V_{offset} + a \cdot t \quad \text{[Mathematical Expression 3]}$$

where a denotes voltage change versus time and may be predetermined based on characteristics of the inverter 2 (in FIG. 1) or the like.

In this manner, a larger command voltage can be generated than in the prior art, such that it is possible to prevent occurrence of inrush current resulted from an error in the magnitude of voltage.

FIG. 8 is a diagram for illustrating a way of determining a magnitude of a command voltage according to a second exemplary embodiment of the present disclosure. As can be seen from FIG. 8, the magnitude $V_{ref}$ of the command voltage in the restart section is calculated by adding an output value from a proportion controller 8B to the magnitude of the voltage change versus time determined by a gradient determining unit 8A. An output value from the proportion controller 8B is obtained by inputting the magnitude $V_{mag}$ of the input voltage to the electric motor determined by the voltage magnitude and phase determining unit 42 (in FIG. 3) to the proportion controller 8B, as shown in FIG. 8.

As described above, the magnitude of voltage change versus time determined by the gradient determining unit 8A may be a preset value taking into account the capacity of an electric motor, etc., or a value input by a user.

By inputting the magnitude $V_{mag}$ of the input voltage to the electric motor to the proportion controller 8B, the output from the proportion controller 8B becomes larger than the magnitude of the input voltage $V_{mag}$ to the electric motor. As a result, a larger command voltage can be generated than in the prior art. It is to be understood that a proportional constant K of the proportion controller 8B may be determined based on characteristics of the electric motor or the inverter, etc.

Accordingly, according to the second exemplary embodiment of the present disclosure, in the control unit 40, the output voltage from the inverter is larger than the residual voltage of the electric motor 3, such that neither regeneration operation nor inrush current takes place.

Figure 9:
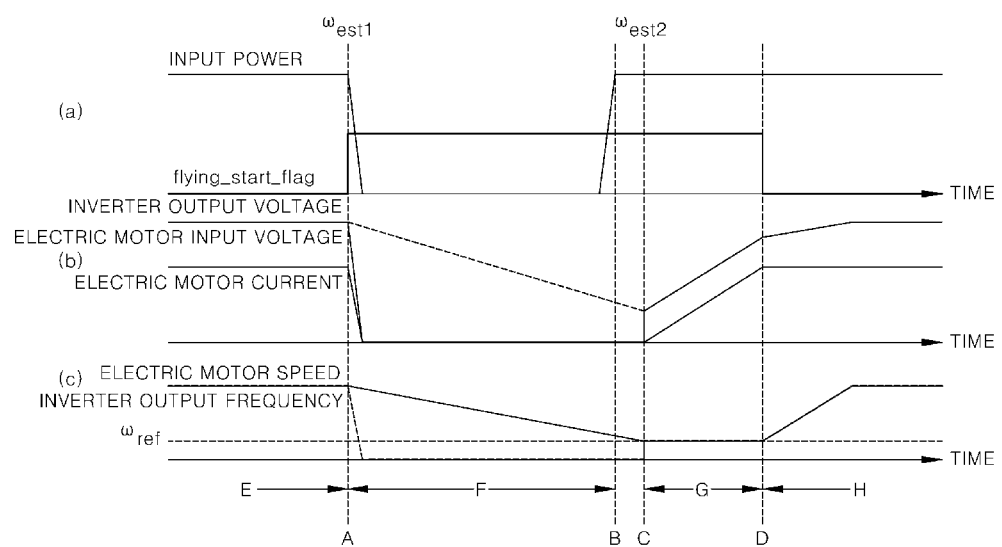
FIG. 9 is a graph for illustrating a sequence of restarting an inverter according to the exemplary embodiment of the present disclosure.

FIG. 9 is a graph for illustrating a sequence of restarting an inverter according to the exemplary embodiment of the present disclosure. The same reference numerals as those in FIG. 6 are used in FIG. 9 for easy comparison with the prior art.

As can be seen from FIG. 9, an input power supplied from a power supply 1 (in FIG. 1) is interrupted at time point A and is restored at time point B. Even though the input power is restored at time point B, the electric motor restarts at time point C after some time interval (B-C) and is operated normally from time point D, as shown in FIG. 6. That is, the electric motor is operated normally in sections E and H, abnormality occurs in input power in section F, and the electric motor restarts in section G.

A flag setting unit 45 (in FIG. 3) may set a flag to 1 (ON) at time point A when an error takes place in an input power as shown in (a), and may set the flag to 0 (OFF) at time point D when the restart section ends.

When an error takes place in an input power, the inverter 2 (in FIG. 1) is interrupted for protection. Accordingly, the output voltage from the inverter becomes immediately 0, as shown in (b). In contrast, it can be seen that the input voltage to the electric motor 3 (in FIG. 1) measured in the input power error section (section F) does not become 0 but maintains a certain level due to the induced electromotive force of the electric motor 3.

That is, the magnitude of the input voltage to the electric motor 3 and the speed of the electric motor 3 decrease gradually according to a load and the time constant of the electric motor 3. The electric motor current is 0 since no path is formed, as shown in FIG. 9.

When an input power is applied again at time point B, the voltage magnitude and the phase determining unit 42 determines the magnitude and the phase of the input voltage to the electric motor 3 based on the measured value of the voltage measuring unit 30 (in FIG. 1) at time point C after a time interval from time point B. Then, the inverter 2 restarts based on the magnitude and the phase of the command voltage determined by the restart command voltage determining unit 43. In other words, in accordance with the operation of the flag setting unit 45, in section G where the electric motor restarts, the command voltage determined by the restart command voltage determining unit 43 is provided to the inverter 2.

That is, the magnitude of the restart command voltage may be determined by adding the magnitude $V_{mag}$ of the input voltage to the electric motor and the offset voltage $V_{offset}$ to the magnitude of the voltage change versus time (see FIG. 7). Alternatively, the magnitude of the restart command voltage may be determined by adding a result obtained by performing proportion controller on the magnitude $V_{mag}$ of the input voltage to the electric motor to the magnitude of the voltage change versus time (see FIG. 8).

At this time, a phase of the time integral of frequency $\omega_{est}$ of the input voltage to the electric motor to which the phase $\theta_{est}$ of the input voltage to the electric motor at the time of restarting is added may be used for the phase of the restart command voltage, as already described above with reference to FIG. 5.

The restarting section (section G) ends at time point D where the output voltage from the inverter reaches a predetermined voltage level. When this happens, the flag is set to 0, and the selecting unit 46 provides the command voltage determined by the command voltage determining unit 44 to the inverter 2 on behalf of the restart command voltage determining unit 43, such that the inverter system may be normally operated.

In addition, as the output frequency from the inverter, the same frequency as that determined by the voltage magnitude and phase determining unit 42 has determined at time point C is applied in section G. The output frequency of the inverter may increase according to the voltage-frequency relationship after time point D.

As described above, in the apparatus for controlling an inverter according to the exemplary embodiment of the present disclosure, a voltage larger than the magnitude of the residual voltage of the electric motor is applied to the inverter at the time of restarting of an inverter system including the inverter and the electric motor, such that inrush current due to regeneration can be prevented. As a result, the inverter can be restarted stably.

Furthermore, by implementing the apparatus for controlling an inverter, it is possible to overcome problems such as voltage error due to resistance error even with a voltage detecting device consisting of a passive element such as a resistor. As a result, an inverter system can be implemented more efficiently and stably at lower cost.

According to exemplary embodiments of the present disclosure, a voltage larger than a residual voltage in an electric motor is applied to an inverter at the time of restarting, such that a regeneration operation of the inverter occurring when a current flows back and an inrush current is prevented. As a result, the inverter can be restarted stably.

In addition, the inverter system can be operated efficiently and stably while saving cost for configuring the inverter system by allowing the voltage detecting unit consisting of a passive element such as a resistor to be employed.

Although the exemplary embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. An apparatus for controlling an inverter in an inverter system, the apparatus comprising:
   a voltage detecting unit configured to detect an input voltage to an electric motor in the inverter system;
   a transforming unit configured to transform the input voltage detected by the voltage detecting unit to d-axis and q-axis voltage components in a synchronous coordinate system and provide it to a first determining unit;
   the first determining unit configured to determine a magnitude, a phase and a frequency of the input voltage based on information from the transforming unit; and
   a second determining unit configured to determine a restart command voltage for generating an inverter driving voltage larger than a residual voltage in the electric motor based on the magnitude of the input voltage determined by the first determining unit, when the inverter system is restarted, wherein the magnitude of the restart command voltage is larger than a value corresponding to the magnitude of the input voltage and a magnitude of a predetermined voltage change versus time until an output from the inverter reaches a predetermined voltage level, wherein the second determining unit determines the magnitude of the restart command voltage based on the magnitude of the input voltage, the magnitude of the predetermined voltage change versus time and a predetermined offset voltage.

2. The apparatus of claim 1, wherein the second determining unit is configured to determine a phase of the restart command voltage to be coincident with the phase of the input voltage determined by the first determining unit.

3. The apparatus of claim 2, wherein the second determining unit is configured to determine the phase of the restart command voltage by adding a phase of a time integral of the frequency ($\omega_{est}$) of the input voltage to the phase of the restart command voltage until an output from the inverter reaches a predetermined voltage level.

4. The apparatus of claim 1, wherein the magnitude of the restart command voltage is larger than a sum of the magnitude of the input voltage and the magnitude of the predetermined voltage change versus time.

* * * * *